(12) United States Patent  
Cattaneo (10) Patent No.: US 6,729,244 B2  
(45) Date of Patent: May 4, 2004

(54) TUBULAR-FRAME STRUCTURE FOR SUPPORTING SURFACES

(75) Inventor: Carlo Cattaneo, Figino Serenza (IT)

(73) Assignee: Leonardo S.r.l., Figino Serenza (IT)

( * ) Notice: Subject to any disclaimer, the term of this patent is extended or adjusted under 35 U.S.C. 154(b) by 0 days.

(21) Appl. No.: 10/078,879

(22) Filed: Feb. 19, 2002

(65) Prior Publication Data

US 2002/0112654 A1 Aug. 22, 2002

(30) Foreign Application Priority Data

Feb. 22, 2001 (IT) ..................................... MI2001A0354

(51) Int. Cl.[7] .............................................. A47B 47/00
(52) U.S. Cl. .................. 108/155; 108/158.11; 403/170; 403/172; 411/107; 411/339; 411/401
(58) Field of Search ................................ 108/155, 156, 108/158.11; 403/169, 120, 172, 180, 182, 217, 218; 411/107, 339, 401

(56) References Cited

U.S. PATENT DOCUMENTS

| 1,572,770 | A | * | 2/1926 | Colley | 411/353 |
| 3,008,741 | A | * | 11/1961 | MacCormack | 403/7 |
| 3,277,770 | A | * | 10/1966 | McCulloch | 411/65 |
| 3,521,579 | A | * | 7/1970 | Stafford | 108/64 |
| 3,638,803 | A | * | 2/1972 | MacMillan | 211/189 |
| 4,318,629 | A | * | 3/1982 | Yamamoto | 403/297 |
| 4,691,885 | A | * | 9/1987 | Lawrance | 248/165 |
| 5,598,790 | A | * | 2/1997 | Fich | 108/158.11 |
| 6,024,024 | A | * | 2/2000 | Favaretto | 108/64 |

FOREIGN PATENT DOCUMENTS

| EP | 0 399 371 | 11/1990 | |
| EP | 403167 A2 | * 12/1990 | ........... A47B/13/08 |
| EP | 0 847 715 | 6/1998 | |
| EP | 0 976 346 | 2/2000 | |
| FR | 2578297 A1 | * 9/1986 | ............. F16B/7/04 |

OTHER PUBLICATIONS

EP Search Report.

* cited by examiner

Primary Examiner—Lanna Mai  
Assistant Examiner—John Fitzgerald  
(74) Attorney, Agent, or Firm—Hedman & Costigan, P.C.

(57) ABSTRACT

A tubular-frame structure for supporting surfaces comprising a supporting surface (12, 12'), a flat frame (13) and legs (14), in which said frame (13) is composed of tubular profiles (15) which can be combined in various ways, characterised in that all the elements are joined through connection means which provide a firm and dismountable connection, constituted by devices (16) for coupling tubular profiles (15) and devices (17) for coupling tubular profiles (15) with a leg (14).

9 Claims, 14 Drawing Sheets

TUBULAR-FRAME STRUCTURE FOR SUPPORTING SURFACES

The present invention refers to a tubular-frame structure for supporting surfaces, particularly but not exclusively for the realisation of tables.

As is well known to men skilled in the art, the realisation of office-desks requires a lot of flexibility as to the configuration and arrangements of surfaces to combine functionality and appearance. Particularly in "open space" office applications, which seems to be an expanding sector, work desks are frequently positioned at an angle with each other or else in a complex arrangement.

The need to cut production costs and to also allow companies which are not specialised in making office furniture to offer a vast range of solutions which can satisfy the most varying requirements to its customers has led to the development of modular solutions.

For the realisation of work desks the assembly is widely carried out using a supporting surface and a frame structure with legs, which can be put together varyingly according to requirements.

These single components must allow an assembly which is fast but stable, to obtain a solid structure without the risk of deterioration of the materials used.

For practicality, tables are usually made up, to as great a degree as possible, of detachable parts to make transportation and storage easier, thus considerably reducing encumbrance.

The main drawback of work desk structures currently in use is that they are not composed entirely of detachable and standardised construction elements, which could be used in a whole range of finished products, but this does require specifically designed elements. This substantially reduces the number of different products which can be offered.

One field which is also susceptible to improvement regards, indeed, the optimisation of transportation of partially pre-assembled tables, which should harmonise the reduction in encumbrance of items with a small requirement in manpower for the final assembly.

The general purpose of the present invention is to overcome the drawbacks of the prior art mentioned above in an extremely simple, cost-effective and particularly functional way.

Another purpose is to allow a wide choice in materials to be coupled to realise the single elements of the table and of the structure without any technological limit to the combination of materials.

In view of the aforementioned purposes, according to the present invention, we put our minds to realising a tubular-frame structure for supporting surfaces, in which all the segments are attached through joints, having the characteristics shown in the attached claims.

The structural and functional characteristics of the present invention and its advantages compared to the prior art will become even more clear and evident through the examination of the following description, referring to the attached drawings, which show a tubular-frame structure for supporting surfaces realised according to the innovative principles of the invention itself.

In the drawings:

FIG. 3b shows schematic stages of the final assembly of a frame structure packaged as indicated in FIG. 3a;

Figure 1:
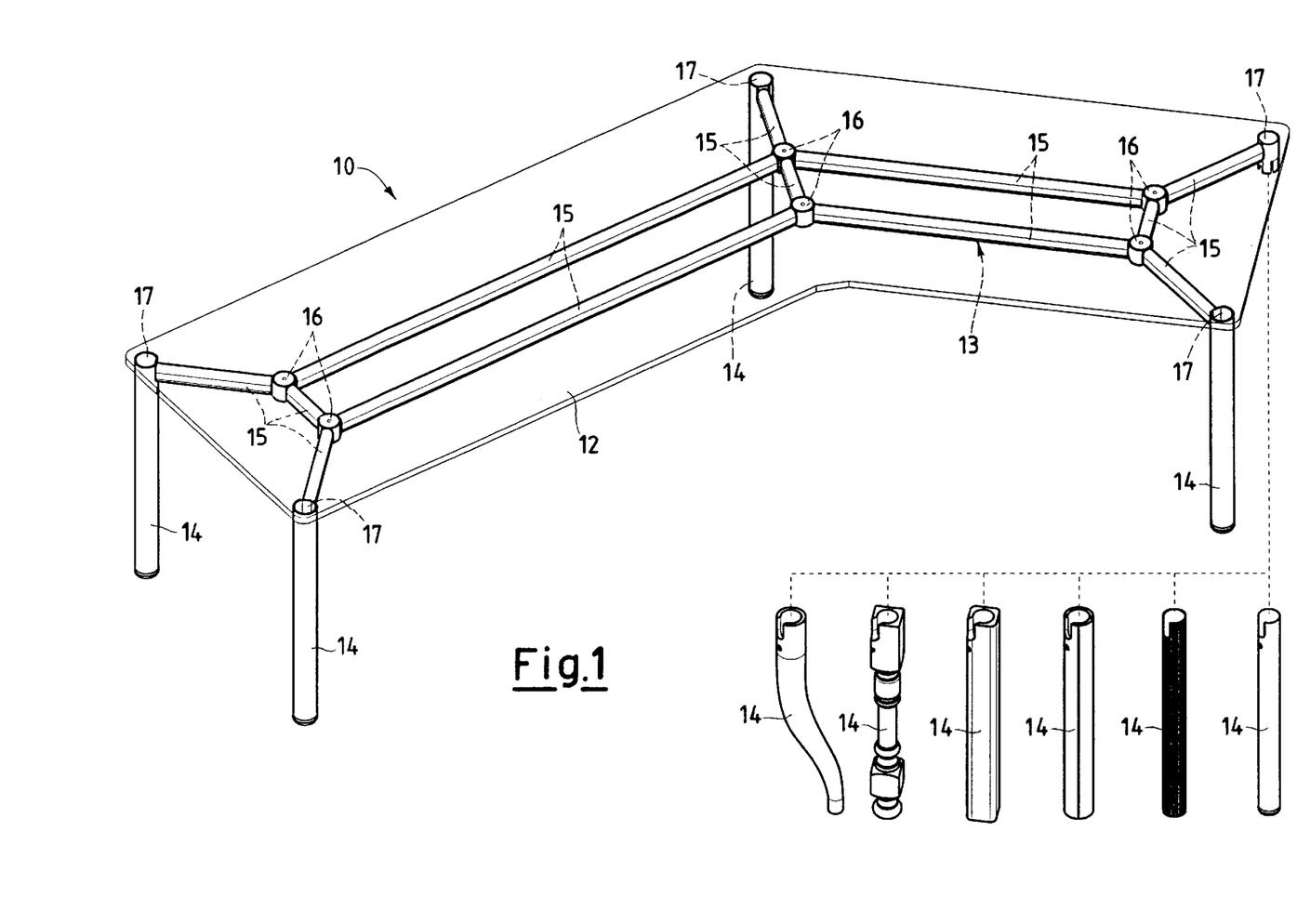
FIG. 1 shows a perspective view of a first embodiment of a tubular-frame structure for supporting surfaces, object of the present invention in which a plurality of attachable legs is schematised.
Figure 2:
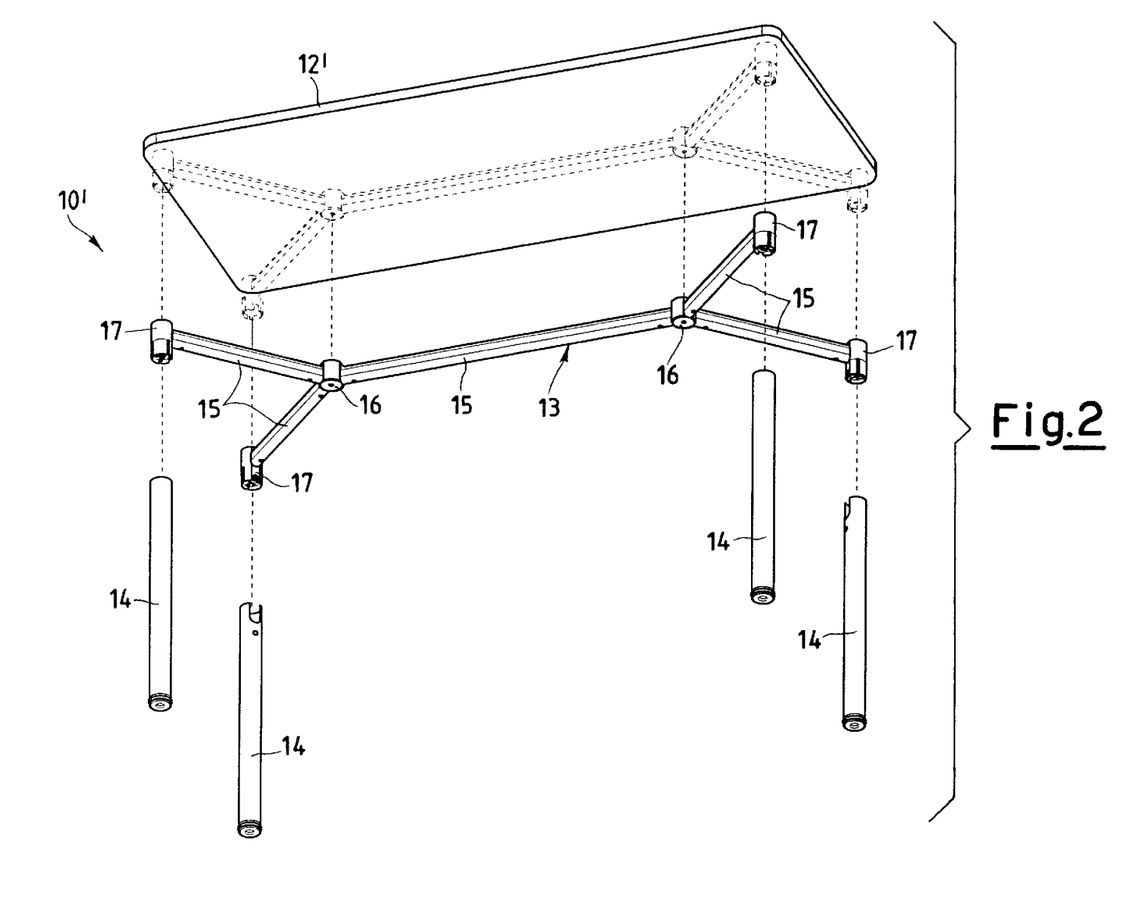
FIG. 2 is an exploded view of a second embodiment of a tubular-frame structure for supporting surfaces.

With reference to the drawings, a tubular-frame structure for supporting surfaces in re is indicated in its whole with 10 or 10', and in the embodiments illustrated according to the present invention, comprises a supporting surface 12 or 12', a flat frame 13 and tubular legs 14 which are variable in realisation (FIG. 1). The flat frame 13, shown in FIG. 2, is composed of tubular profiles 15, which can be put together variably, and detachable coupling devices, comprising both coupling devices 16 between two or more tubular profiles and coupling devices 17 between tubular profile and leg.

The frame 13 can be assembled for each specific application to support angulated 12 (FIG. 1) or rectangular 12' (FIG. 2) supporting surfaces, carrying a substantial weight according to use.

In a first embodiment of the tubular-frame structure 10, which has an angulated supporting surface 12, the flat frame 13 is composed of two parallel tubular profiles, for each part of supporting surface 12. The tubular profiles 15, positioned lengthways, are connected at their ends by tubular coupling profiles. From these end points also project the tubular profiles for joining with the legs 14, positioned at the corners.

In a second embodiment of the tubular-frame structure for supporting surfaces 10' there is a flat frame 13, composed of a tubular profile 15, positioned lengthways with respect to the supporting surface 12', from the ends of which project further tubular profiles for joining with the legs 14, positioned on the four corners.

All the tubular profiles 15 mentioned above are interchangeable amongst themselves for forming flat frames 13 of the desired form to support generic supporting surfaces 12 or 12'. The connections are realised through coupling devices for many profiles 16. The legs used in tubular-frame structures for supporting surfaces 10 and 10' can be realised in different materials, possibly even in wood, of a generic type. The only restraint in this respect is that they must be tubular and adapted at their respective upper end to interact with the device 17 for coupling profile and leg. Such legs can, for example, also be used advantageously in other types of table, without a tubular-frame structure, provided that there is a suitable device for engaging with said tubular legs on the supporting surface of such tables.

Figure 3A:
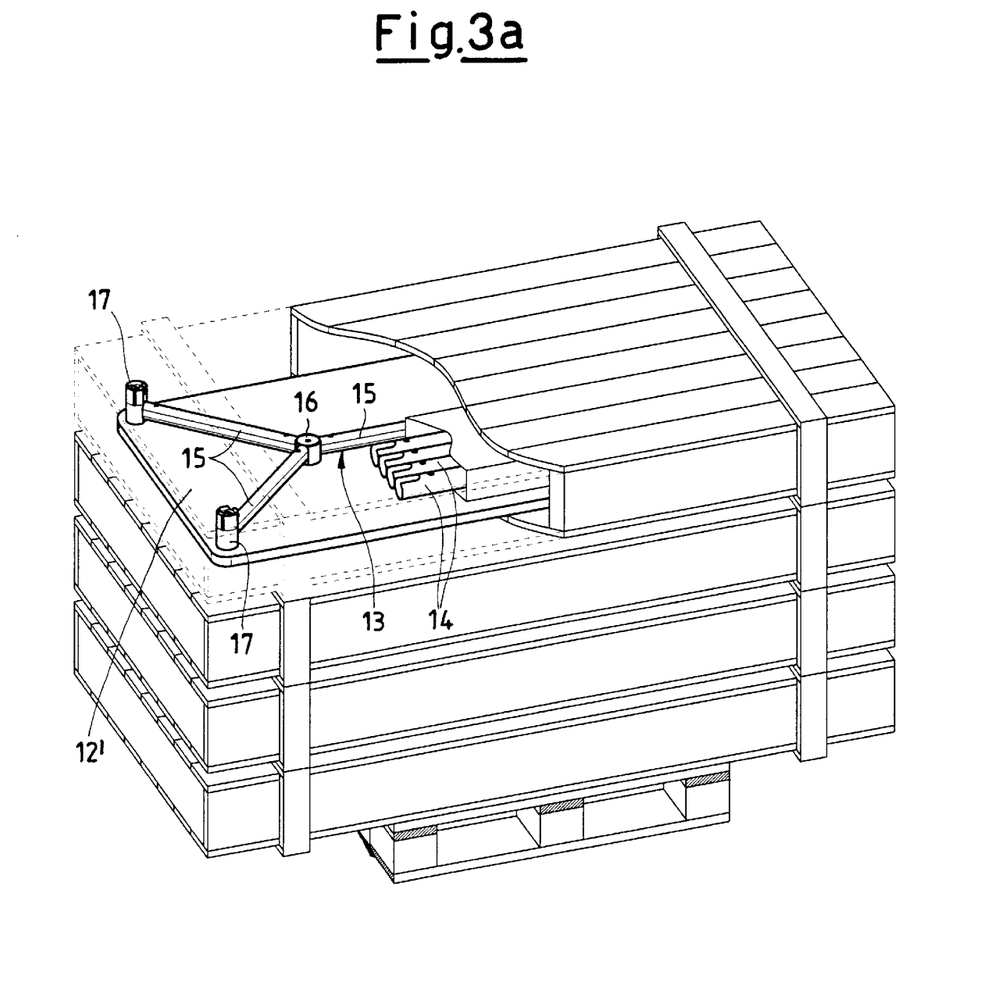
FIG. 3a shows a pallet made up of four casings for a tubular-frame structure for supporting surfaces, transported with a flat frame pre-assembled on a supporting surface and separately packaged legs.
Figure 3B:
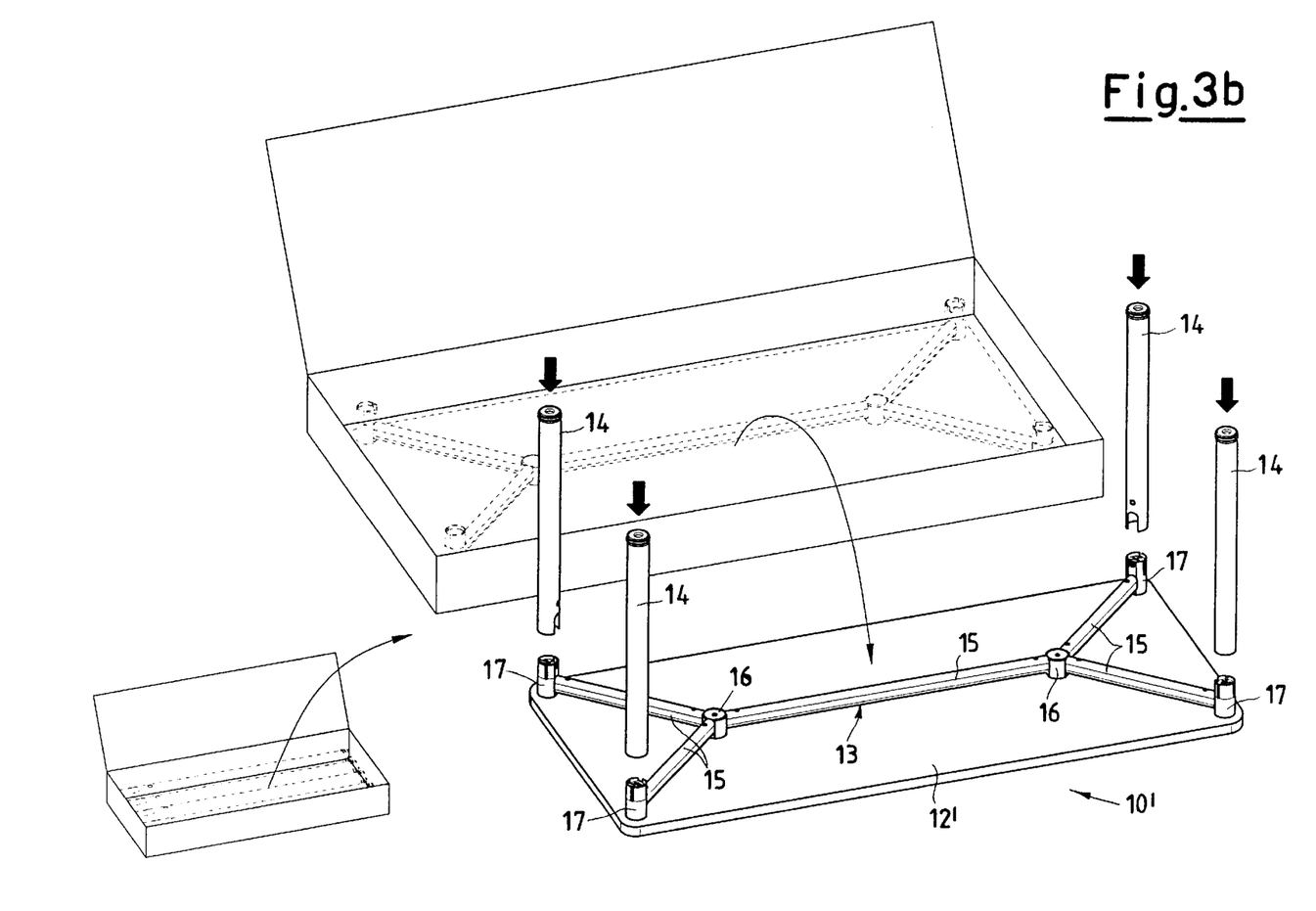

The tubular-frame structure for supporting surfaces, described here, can be packaged for transportation in pre-assembled form, as schematised in FIG. 3a. Indeed, it proves advantageous in terms of a reduction in volume for transportation as well as a reduction in the time necessary for the final assembly, schematised in FIG. 3b, to attach the flat frame 13 to the supporting surface 12 or 12' at the time of production, to limit the final assembly to the simple connection of the legs 14.

The coupling devices 16, 17 are composed of a body 18, from which, on a plane parallel to the supporting surface 12, projects at least one socket 19 for coupling with the tubular profiles 15 and, in an incident direction with respect to said surface 12, perpendicular or at an angle, possibly even a connector 20 for the releasable connection of a leg 14.

As examples, a device for coupling profiles 16, with three sockets 19 radially projecting from the body 18, are shown in FIGS. 6–9. Each socket 19 is suitable to be inserted into the ends of the tubular profiles 15, generally metallic and shaped complementarily, and attached rigidly to them to realise the flat frame 12 or 12', as schematised in FIGS. 4 and 5, which show a portion of the tubular-frame structure for supporting surfaces 10 or 10'.

Body 18 and sockets 19 can be realised in one piece, generally metal, for example in aluminium, or even in plastic, having the necessary physical and mechanical characteristics to be used with the device.

The body 18 is moreover equipped to be linked solidly with the supporting surface 12 or 12', as schematised in FIG. 2.

Figure 10:
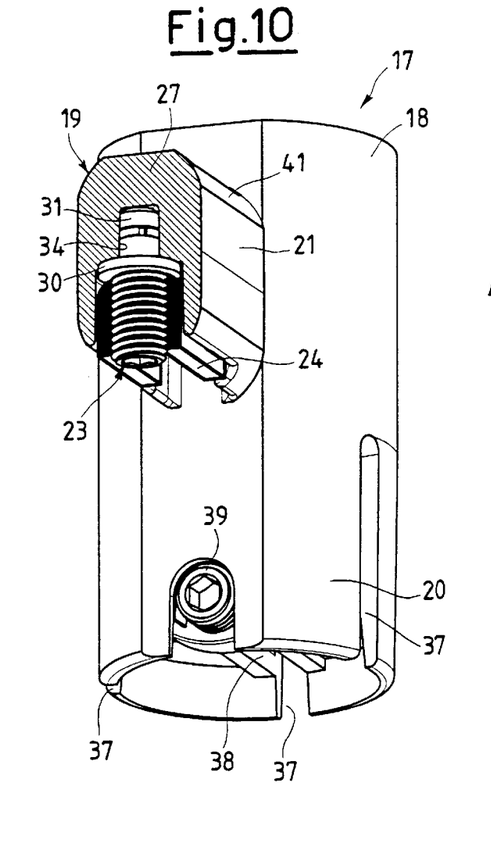
FIGS. 10 and 11 are partially sectioned perspective views of a device for coupling a profile with a leg.
Figure 11:
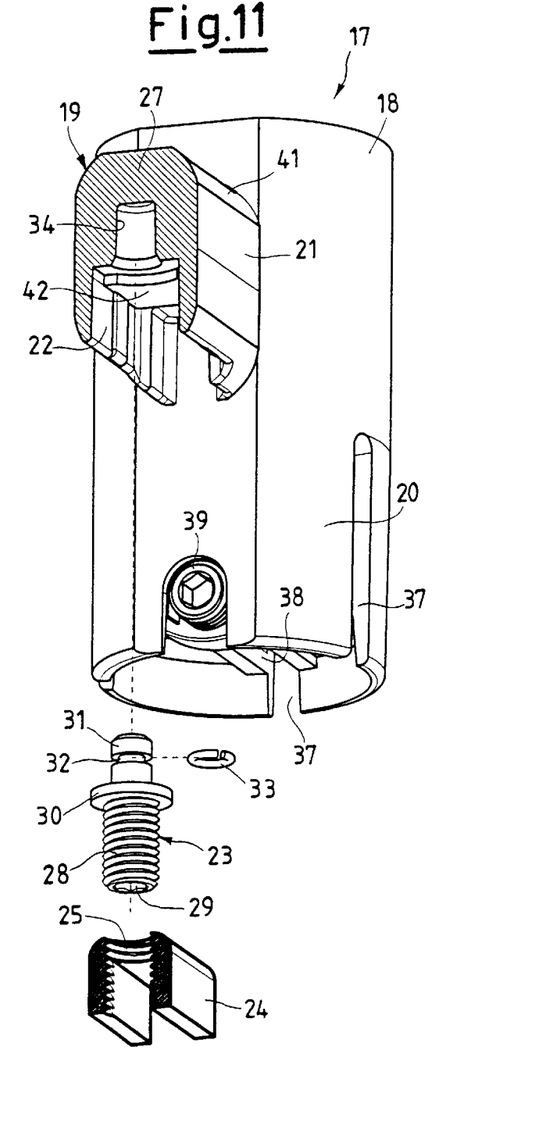

The socket 19 has a non-continuous external wall 21, which, when the device is attached, makes contact with the inside of the tubular profiles 15 long curved portions 41. The wall 21 defines a seat 22, bound at the base by an abutment surface 42, which houses both a threaded fastener set-screw 23 and a blocking means, a U-beam 24, equipped with a threaded hole 25, elements which can be seen in the exploded representation of FIG. 7. The external wall 21 can, moreover, be partially split into portions 26, diametrically opposed to the seat 22 provided that they project to form a bridge 27 of dense material in correspondence with the threaded fastener set-screw 23. These details can be seen clearly in the representations 10 and 11, referring to an example of a device 17 for coupling profiles 15 and legs 14, in which the socket 19 is sectioned in correspondence with the bridge 27.

The threaded fastener set-screw 23 is composed of a threaded shaft 28, equipped with a socket head seat 29 for actuation through a complementary key (not shown), an abutment crown 30 and shaft 31, equipped with a groove 32 for housing a sealing element 33 in the form of a broken ring made of hardened steel.

The threaded fastener set-screw 23 engages in the threaded hole 25 of the beam 24 until the crown 30 can no longer move. The shaft 31, at the upper end, is inserted in a hole 34 formed in the seat 22 in the middle part of the abutment surface 42, until it abuts the crown 30. The threaded fastener set-screw 23 is thus secured to the socket 19 through the tightening of the ring 33.

Figure 5:
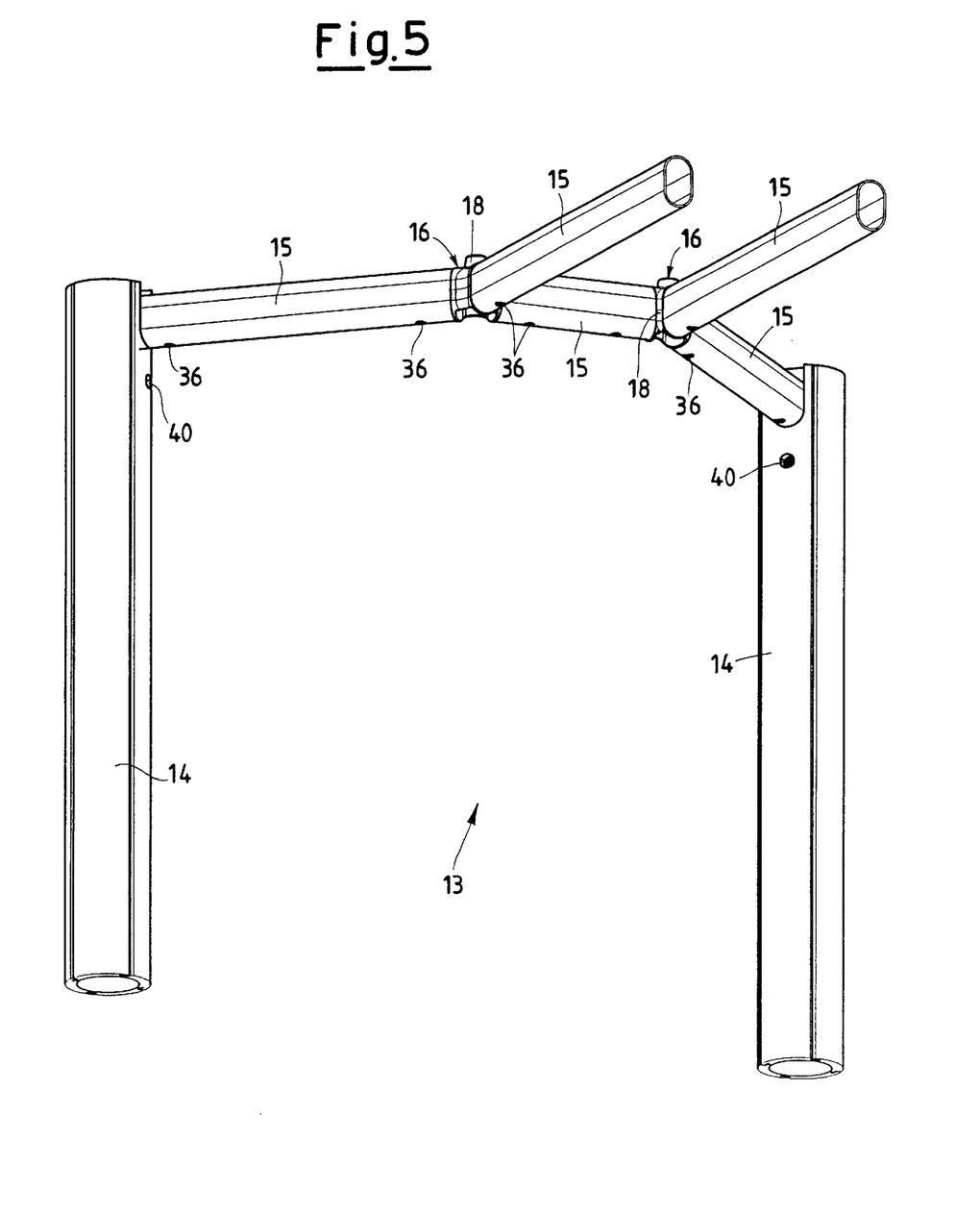
FIG. 5 shows the portion of the frame in FIG. 4 assembled.
Figure 6:
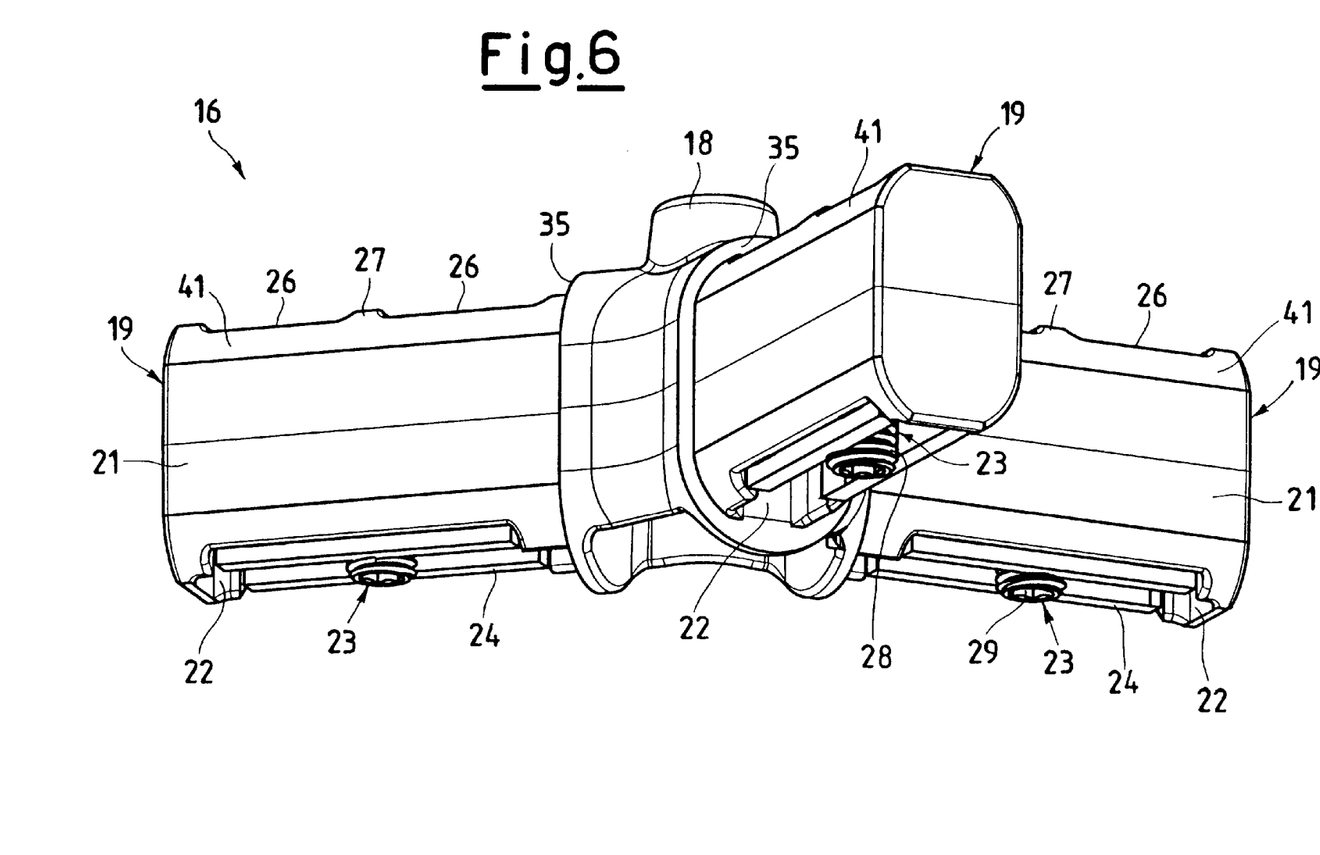
FIG. 6 is a perspective view of a device for coupling profiles carrying three sockets.
Figure 7:
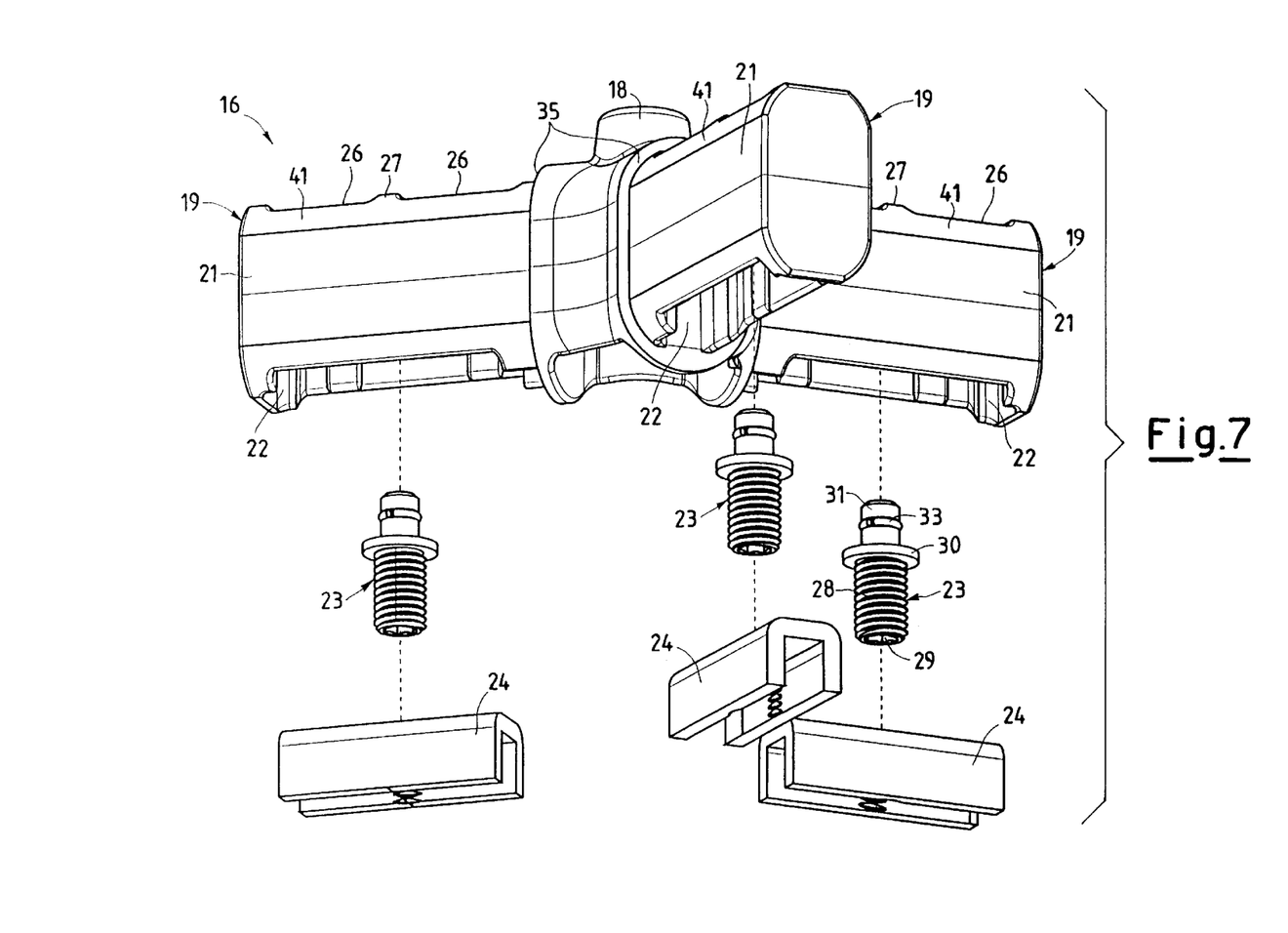
FIG. 7 shows an exploded view of FIG. 6.
Figure 8:
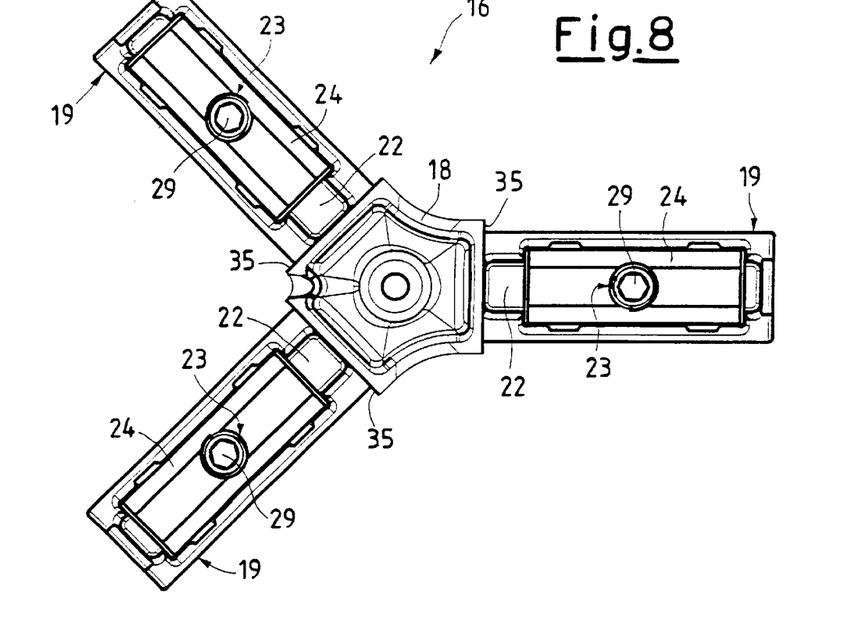
FIG. 8 is a plan view from below of the device in FIG. 6.
Figure 9:
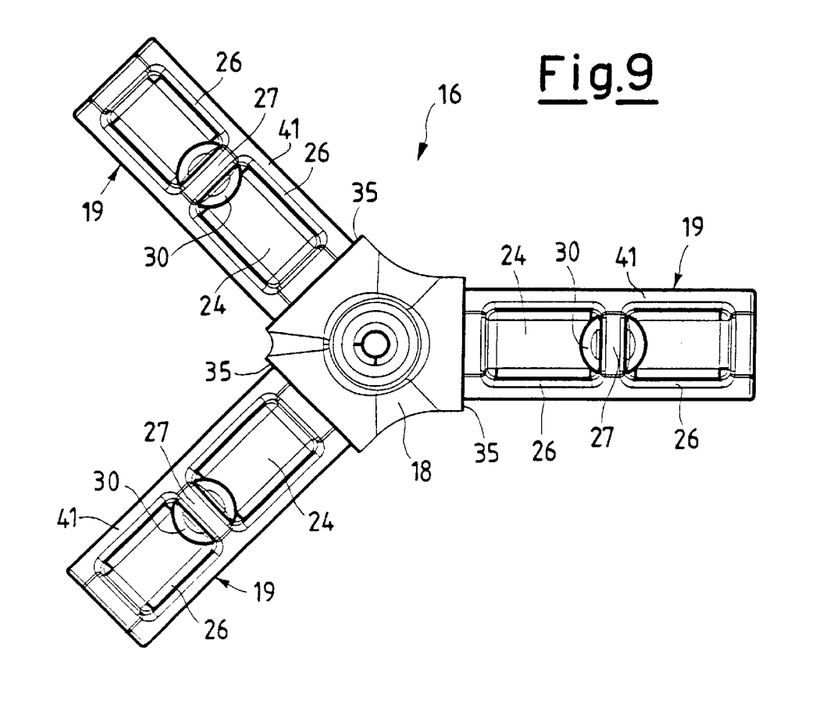
FIG. 9 is a plan view from above of the device in FIG. 6.

The socket 19, thus positioned, is fitted into the tubular profile 15 of complementary form, until the end of the profile hits an abutment surface 35 of the body 18 in the position represented in FIG. 5. Access into the threaded fastener set-screw 23 is realized through a hole 36, made in the tubular profile 15, which is, in this position, lined up with the socket head seat head seat 29 for actuation through a key.

The shaft 31 of the threaded fastener set-screw 23, locked in the hole 34, is able to rotate, but not to move along its axis.

The actuation of said threaded fastener set-screw 23 causes the threaded shaft 28 to be screwed into the complementary hole 25 of the beam 24, which being locked in the seat 22, is forced to move along said seat 22, to place itself in an pulled out position.

The tubular profile 15 can be separated from the socket 19 by unscrewing the threaded fastener set-screw 23, so as to take the beam 24 back to position inside the seat 22 which does not cause interference.

The connection of the tubular profile 15 and the socket 19 which is stable and long-lasting, which can however easily be taken apart is thus obtained.

The coupling devices 17 can foresee, besides the socket 19 for the profile 15, also a coupling system with the tubular leg 14. Such coupling systems can be of various types, such as for example threaded couplings, threaded-shaft nut or bolt-threaded hole, or else expansion coupling, as in the example already shown in FIGS. 10 and 11.

Figure 12:
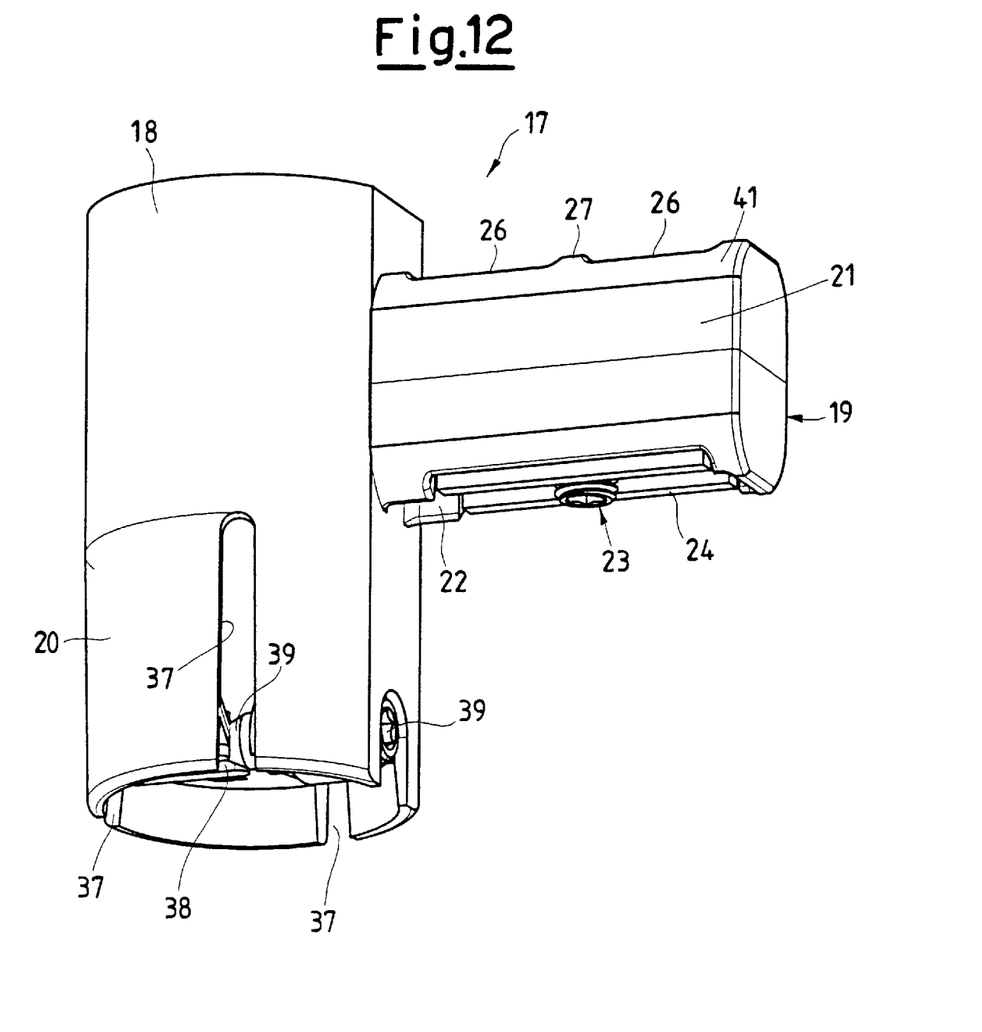
FIGS. 12 and 13 are perspective views of the device in FIGS. 10 and 11.
Figure 13:
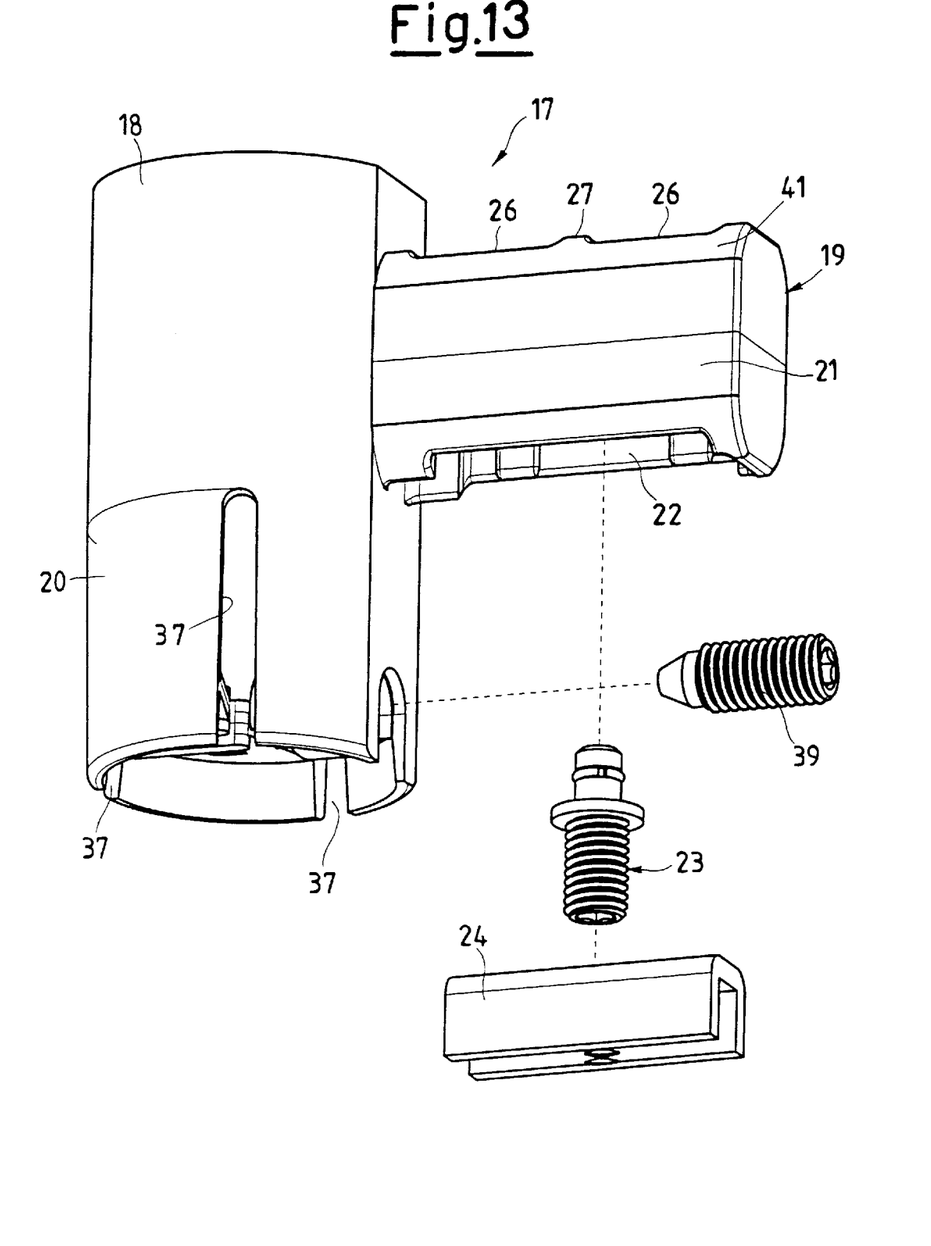
Figure 14:
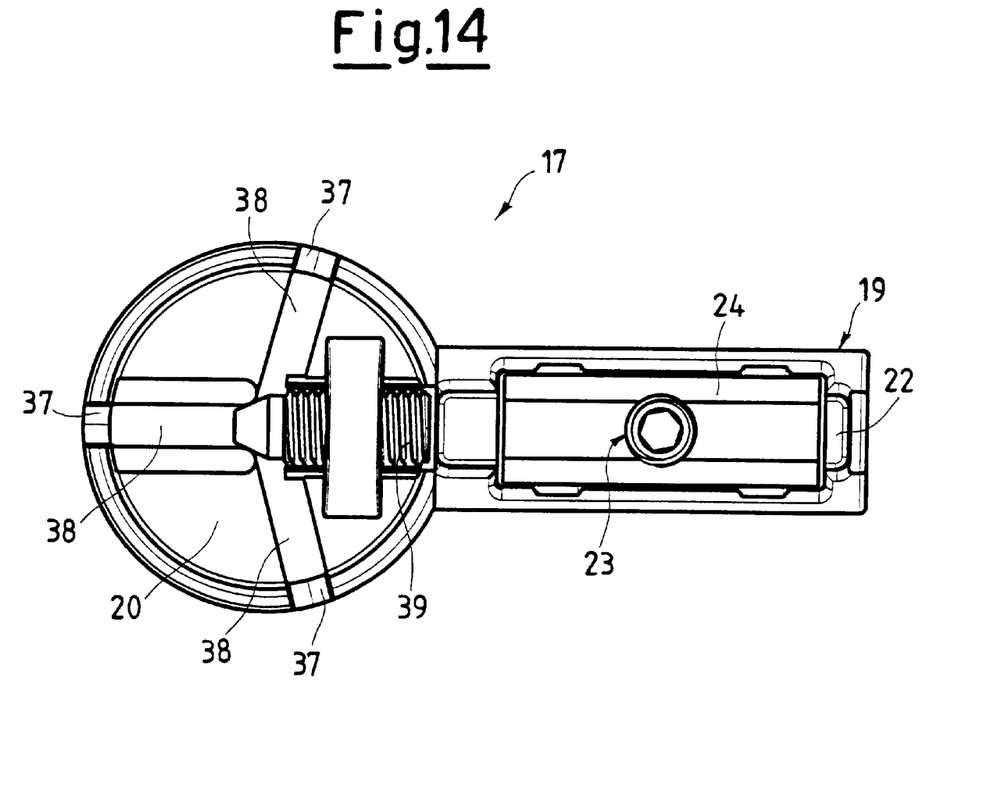
FIG. 14 is a plan view from below of the device for coupling a profile with a leg.
Figure 15:
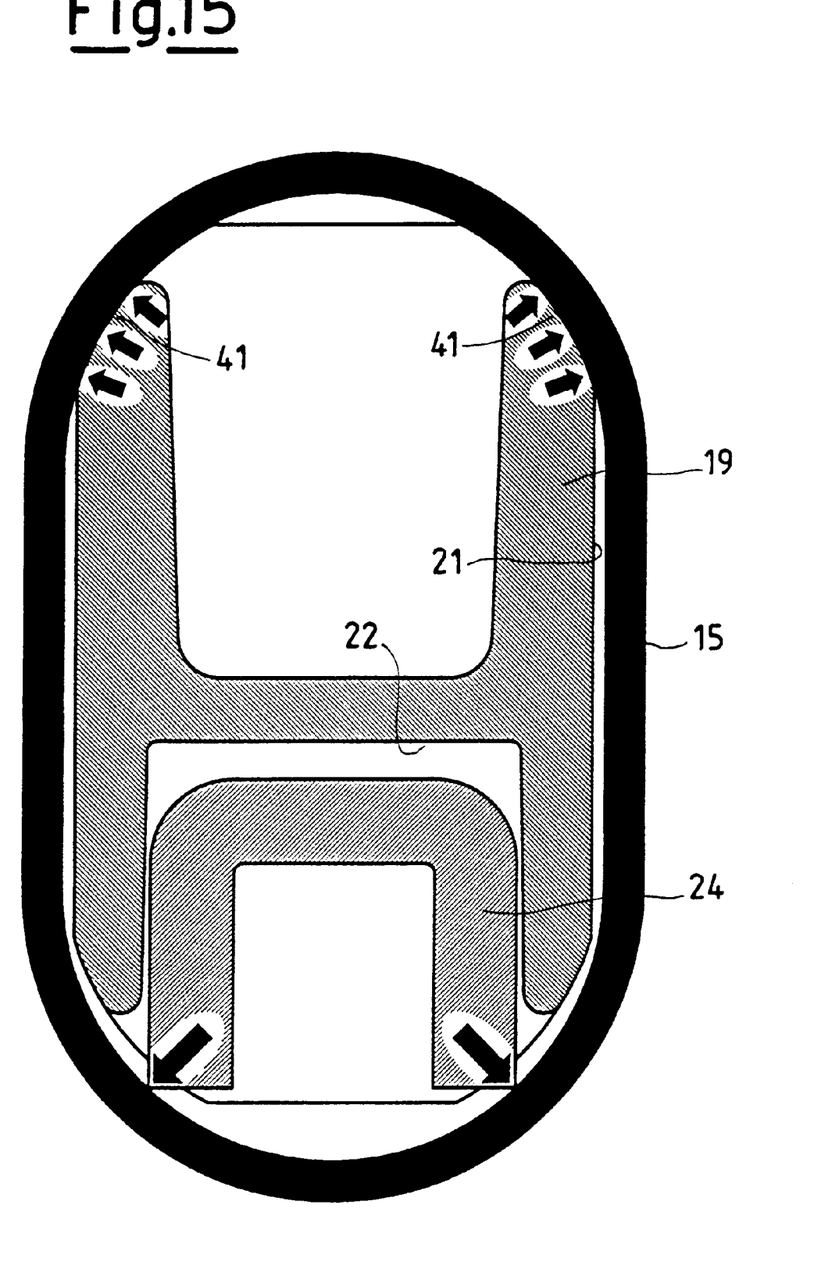
FIG. 15 is a cross-section illustrating the behaviour of the socket (19) with the profile (15), through the beam (24).

The coupling device 17, shown in FIGS. 12–14, is equipped with a connector 20 for releasable connection to a leg 14, which projects from the body 18 in a generic direction perpendicular or at an angle with respect to the socket 19.

The connector 20 is composed of an expandable cylindrical body, equipped with a plurality of notches 37 along the generatrix of the cylinder, which interlock with radial notches 38, on which acts a grain 39, which can be actuated through a key, which engages in a threaded seat.

Figure 4:
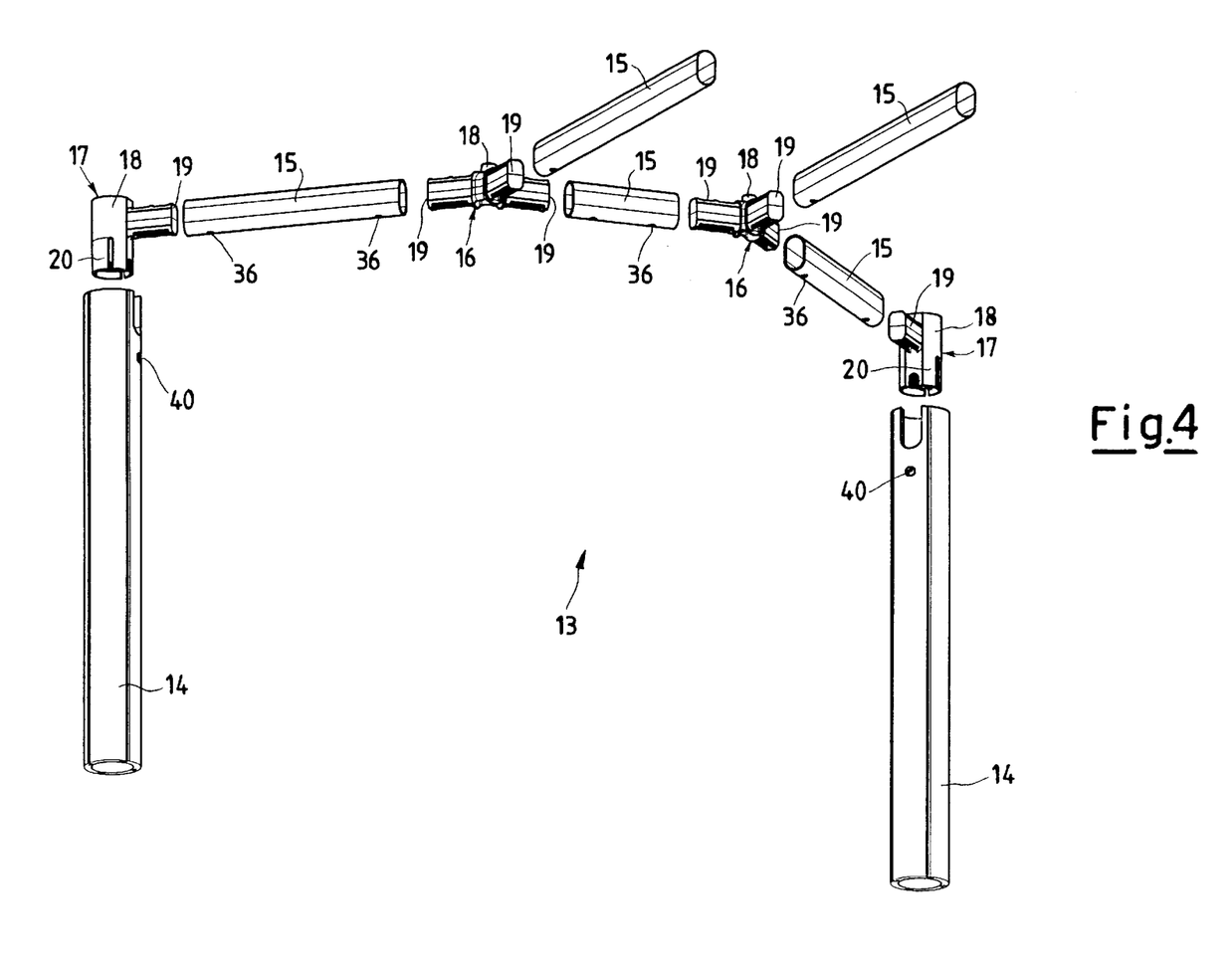
FIG. 4 is a detail of the assembly of a frame from FIG. 1.

To attach the legs 14 one only has to insert them into the connector 20 of the coupling device 17 being careful to line up a hole 40 which is on the cylindrical wall of the leg 14 with the operation grain 39 of the connector 20 (FIGS. 4 and 5). The actuation of the grain 39 causes the expansion of the cylindrical body of the connector 20 and thus a connection which is stable, but which can be dismantled, of the tubular legs to the flat frame 13 to form the tubular-frame structure for supporting surfaces 10 or 10', object of the present invention.

The final stage of attachment of the legs 14 to the flat frame 13, as described in the example, is easily carried out at the time of the final assembly of the tubular-frame structure for supporting surfaces 10 or 10' at the premises of the end user using just a common socket head key.

From what has been described above with reference to the figures, it becomes clear how a tubular-frame structure for supporting surfaces according to the invention is particularly useful and advantageous. The purpose mentioned in the preamble to the description is thus achieved.

Of course, the forms of the tubular-frame structure for supporting surfaces, object of the present invention, can be different from that shown as a non-limiting example in the drawings, just as different materials can also be used.

Moreover, the frame structure was described as an example, attached to a supporting surface for the realisation of tables and desks. In the same way, in other examples not shown, the tubular-frame structure for supporting surfaces can be used to support generic furniture.

The scope of protection of the invention is therefore defined by the attached claims.

What is claimed is:

1. Tubular-frame structure for supporting surfaces said tubular-frame structure comprising a supporting surface (12, 12'), a flat frame (13) and legs (14), said frame (13) comprising tubular profiles (15) wherein said supporting surface (12, 12'), said flat frame (13) said legs (14) and said tubular profiles (15) are joined through connection means that provide a stable and dismountable attachment, said connection means being constituted by a first plurality of devices (16) for coupling said tubular profiles (15) and second plurality of devices (17) for coupling said tubular profiles (15) with said legs (14), wherein said coupling devices (16,17) includes at least one projecting connector (19) includes a non-continuous external wall (21), which defines a seat (22) having a base, said seat (22) being outlined at the base by an abutment surface (42), for a beam (24) bearing a threaded hole (25) in which is housed a threaded fastener set-screw, said set screw being threaded at one end and at an opposite end having a shaft (31) having an abutment crown (30) bearing a sealing element (33) mounted in a groove (32) above said abutment crown (30), said opposite end being inserted into a hole (34).

2. Tubular-frame structure according to claim 1, wherein said supporting structure surface (12) has an angulated shape.

3. Tubular-shaped structure according to claim 1, wherein said supporting surface (12') is rectangular.

4. Tubular-frame structure for supporting surfaces according to claim 1, wherein said coupling devices (16, 17) consist of a body (18) from which, on a plane parallel to said supporting surface (12), projects at least one connection (19) for coupling with said tubular profiles (15) and a connector (20) for the releasable connection of a leg (14).

5. Tubular-frame structure according to claim 4, wherein said blocking means is a beam (24) which has a U-shaped cross-section.

6. Tubular-frame structure according to claim 4, wherein said blocking beam (24) creates or removes connection by interfering with the curved portions (41) of the tubular profiles' external wall, opposite the beam (24), by moving within said seat (22) by operation of said threaded fastener set-screw (23).

7. Tubular-frame structure according to claim 4, wherein said tubular profile (15) is placed on said projecting connector (19) until it comes up against an abutment surface (35) of said body (18).

8. Tubular-frame structure according to claim 4, wherein said threaded fastener set-screw is accessible through a hole (36) formed on the tubular profile (15) inserted into the projecting connector (19).

9. Tubular-frame structure according to claim 4, wherein said connector (20) comprises an expandable cylindrical body, equipped with a plurality of notches (37, 38) and having a threaded fastener set-screw, which is actuated from outside tubular leg (14).

* * * * *